UNITED STATES PATENT OFFICE 2,131,750

WATERPROOF AND OILPROOF BINDER

Basil L. Postlethwaite, Newark, Ohio, assignor to Owens-Illinois Glass Company, a corporation of Ohio No Drawing. Application December 12, 1934, Serial No. 757,153. Renewed December 13, 1937

6 Claims. (Cl. 134—17)

My invention relates to a binder adapted for use with fibrous materials for binding the fibers together, and particularly when the material is caked, molded or otherwise formed. The binder may also be used for binding together the individual particles of comminuted, granulated, nodulated or other divided materials.

An object of the invention is to provide a binder which is water resistant, water repellent and oil resistant so that when used, for example, with fibrous material, the fibers will hold together and not lose their original shape in the presence of water, moisture or oil.

Other objects of the invention will appear hereinafter.

The binder in its preferred form comprises two important or essential ingredients, namely, latex and casein which are commonly described as waterproof, and also a third ingredient which has a very low affinity for water, and due to its low surface tension actually repels water. This third material consists of one or more of those metallic soaps which have the property of repelling water. The casein provides a waterproof glue which when used with latex binders, serves as a stiffening material.

The binder is preferably applied to the fibrous or other material to be bonded thereby, as a water emulsion containing the three materials or ingredients above specified. When the water evaporates and the binder sets up, it is resistant to oil and water and is also water repellent. For example, if a mat or cake of glass wool in felted form, in which the material is in a loose open porous condition, has been treated with a waterproof binder such as herein disclosed, it will repel and shed water poured upon it, in a manner similar to a greased surface, the water refusing to soak into or enter the interstices of the fibrous mass. Oil and water if forced into the mass, may soften the material or binder somewhat, but will not dissolve it to any appreciable extent.

I have found that the following formula provides a binder which possesses the above described characteristics and gives very satisfactory results, namely:

| | | |
|---|---|---|
| Casein | grams | 100 |
| Borax | do | 18 |
| Stearic acid | do | 24 |
| Zinc chloride | do | 5.7 |
| Concentrated ammonium | milli-liter | 100 |
| Latex (normal 68% solids) | do | 214 |
| Water | do | 500 |

The constituents of the formula given above, may be varied within certain limits, without destroying or seriously affecting the desirable properties hereinabove set forth. In certain instances, some variation may be desirable, depending upon the form and nature of the material to which the binder is applied and the specific results desired.

I have found that casein may be varied in the above formula between the limits of 50 and 150 grams. Borax may be varied from zero to 40 grams. Stearic acid may be varied between 10 and 50 grams. The zinc chloride may be varied between 2.5 and 12.5 grams, but should always be used in an amount less than one-fourth of the stearic acid.

The concentrated ammonia may be in an amount just sufficient to redissolve the zinc chloride during the amphoteric reaction which takes place between the zinc and ammonia. That is, when the ammonia is added to the zinc chloride solution, an insoluble gelatinous precipitate of zinc hydroxide is formed, which, on further addition of ammonia, forms a soluble compound of ammonium zincate. The amount of ammonium should be at least sufficient to form this soluble compound and may be increased to any dilution desirable.

The amount of latex may be varied between the limits of 100 milli-liters and 300 milli-liters. Water may be added up to any dilution which is suitable to retain the binding properties of the emulsion, about 2000 milli-liters being the maximum.

Other metallic soaps than the zinc stearate resulting from the above formula, may be used in making the binding material comprised in the present invention. These include the following zinc soaps, namely:

Zinc palmitate, zinc oleate, zinc butyrate, zinc resinate.

Where zinc soaps other than the stearate are used, the zinc chloride and fatty acid should be kept in the same molecular proportions as provided by the above recommended proportions of zinc chloride and stearic acid for use in producing zinc stearate.

Metallic soaps other than the zinc soaps above mentioned, may be used. These include, for example, the corresponding aluminum and magnesium soaps. Where these are used, the same molecular proportions should be observed as above indicated. The ammonia should be omitted. Soluble salts of aluminum and magnesium, as, for example, aluminum chloride and magnesium chloride, are substituted for the soluble zinc salt which is formed by the amphoteric reaction above noted.

In compounding the binder, I have found it undesirable to omit either the casein or the latex. However, starch, animal glue or vegetable glue may be substituted for a portion of the casein in any amount up to substantially half the casein. The latex may be omitted and still leave the binder fairly waterproof and oilproof.

In the preparation of a binder comprising zinc soaps, the constituents, except the fatty acid, are mixed together. The fatty acid is then added to the mixture. When the fatty acid is a solid, such as a stearic acid, it should be melted in a portion of the water and added to the mixture in this manner. In the preparation of the binder, when metal salts are used which are not amphoteric with ammonia, such as aluminum, the ingredients may be mixed together in any preferred manner, except as above noted in regard to solid fatty acids, which should be melted in a portion of the water before adding to the mixture.

I claim:

1. A water repellent binder for porous fibrous material having the following ingredients and in substantially the following proportions:

| | | |
|---|---|---|
| Casein | grams | 100 |
| Borax | do | 18 |
| Stearic acid | do | 24 |
| Zinc chloride | do | 5.7 |
| Concentrated ammonium | milli-liter | 100 |
| Latex (normal 68% solids) | do | 214 |

2. A water emulsion of a water repellent binding material for porous fibrous material formed by the combination of the following materials in substantially the following proportions:

| | | |
|---|---|---|
| Casein | grams | 100 |
| Borax | do | 18 |
| Stearic acid | do | 24 |
| Zinc chloride | do | 5.7 |
| Concentrated ammonium | milli-liter | 100 |
| Latex (normal 68% solids) | do | 214 |
| Water | do | 500 |

3. A water repellent binder for porous fibrous material having the following ingredients and in substantially the following proportions:

| | | | |
|---|---|---|---|
| Casein | grams | 50 | to 100 |
| Borax | do | 0 | to 40 |
| Stearic acid | do | 10 | to 50 |
| Zinc chloride | do | 2.5 | to 12.5 | with the amount of chloride not more than one-fourth that of the stearic acid, concentrated ammonium in an amount sufficient to redissolve the zinc chloride during the amphoteric reaction which takes place when the ammonium is added to the zinc chloride solution,

| | | |
|---|---|---|
| Latex | milli-liters | 100 to 300 |
| Water, not more than | do | 2,000 |

4. A water-repellent binder having the following ingredients substantially as and in the proportions described, namely, casein, borax, stearic acid, zinc chloride, ammonium and latex.

5. A water emulsion of a water-repellent binding material for a porous fibrous material, formed by the combination of the following ingredients, namely, casein, borax, stearic acid, zinc chloride, ammonium, latex and water, substantially as described.

6. A water emulsion of a water-repellent binding material for a porous fibrous material, formed by the combination of the following ingredients, namely, casein and concentrated ammonium in substantially equal parts, stearic acid in an amount not greater than about one-fourth the amount of casein, zinc chloride in an amount not more than one-fourth that of the stearic acid, borax, latex in an amount at least equal to the amount of casein and ammonium combined, and water in an amount at least approximately equal to that of the other ingredients combined.

BASIL L. POSTLETHWAITE.